United States Patent [19]

Oravitz, Jr. et al.

[11] 4,196,830

[45] Apr. 8, 1980

[54] METHOD OF AND APPARATUS FOR PREVENTING PREMATURE SEVERING OF SCORED RIBBON EDGES

[75] Inventors: James L. Oravitz, Jr., Cheswick; John R. Dahlberg, Jeannette, both of Pa.

[73] Assignee: PPG Industries, Inc., Pittsburgh, Pa.

[21] Appl. No.: 928,624

[22] Filed: Jul. 27, 1978

[51] Int. Cl.² .......................... B26F 3/06; C03B 33/02
[52] U.S. Cl. ....................................... 225/2; 225/93.5; 225/96.5
[58] Field of Search ........................ 225/2, 93.5, 96.5; 65/113, 112

[56] References Cited

U.S. PATENT DOCUMENTS

| | | | |
|---|---|---|---|
| 3,486,673 | 12/1969 | Madge | 225/96.5 X |
| 3,730,408 | 5/1973 | Dahlberg et al. | 225/93.5 X |
| 3,795,572 | 3/1974 | DeTorre | 225/93.5 X |
| 3,800,991 | 4/1974 | Grove et al. | 225/93.5 X |
| 3,865,673 | 2/1975 | DeTorre | 225/93.5 X |
| 3,909,226 | 9/1975 | McCourty et al. | 225/93.5 X |
| 3,921,873 | 11/1975 | Dahlberg et al. | 225/93.5 X |
| 4,109,841 | 8/1978 | DeTorre | 225/96.5 |

Primary Examiner—Frank T. Yost
Attorney, Agent, or Firm—Donald Carl Lepiane

[57] ABSTRACT

A glass ribbon moves downstream under a pair of scoring wheels to score the bulb edges of the ribbon and thereafter past a cross scorer to laterally score the ribbon. As the ribbon moves further downstream the scores at the bulb edge move under (1) a plurality of hot airstreams which propagate the fissure depth of the score and (2) under a cold airstream to concentrate the stress field about the score line to prevent premature severing of the bulb edges due to mechanical vibrations generated during subsequent opening of the lateral score.

14 Claims, 2 Drawing Figures

METHOD OF AND APPARATUS FOR PREVENTING PREMATURE SEVERING OF SCORED RIBBON EDGES

BACKGROUND OF THE INVENTION

1. Field of the Invention

This invention relates to a method of using heat to propagate fissure depth of a score.

2. Discussion of the Prior Art and Technical Problems

A glass ribbon is displaced downstream from an annealing lehr through scoring and severing stations to (1) remove the bulb edge, i.e., the edge of the glass ribbon engaged during formation thereof to control the ribbon thickness, and (2) cut the glass ribbon into caps or lehr ends, i.e., sections of the ribbon having the bulb edge removed and cut to a predetermined length as measured from the leading edge of the ribbon. There are many techniques for scoring and severing glass taught in the prior art. For example, U.S. Pat. No. 3,730,408 teaches the use of hot air to deepen the fissure depth of a score to about 80% of the glass thickness to minimize the bending moment forces required to sever the glass. Although this technique is acceptable for severing glass sheets, there are limitations when it is used to remove bulb edges from a glass ribbon.

The limitation of using hot air to deepen the fissure depth of the score imposed on the bulb edge is that only 20% of the glass thickness holds the bulb edge to the ribbon. Therefore, the severing of the bulb edge can result from mechanical vibrations which generate bending moment forces about the score. The mechanical vibrations may be caused by a snap roll used at a lateral score opening station. The snap roll is a roll that raises the glass ribbon above the plane of the conveyor to apply bending moment forces about the lateral score line to sever the glass ribbon into lehr ends having bulb edges. The bending moment forces to open lateral scores, i.e., scores across the width of the ribbon, are generated by the snap roll applying an upward force and the weight of the glass about the snap roll applying downward forces. After the lateral score is opened, the snap roll drops to the plane of the conveyor. The glass ribbon continues to advance along the conveyor until the next score line is in position for opening.

It has been found that raising the glass ribbon above the plane of the conveyor and thereafter dropping it to the plane of the conveyor sets up mechanical vibrations which are transmitted along the score lines imposed in the bulb edge of the ribbon. These vibrations have been found to act as bending moments which cause the bulb edge to prematurely separate from the ribbon. In addition to the obvious safety problem, the other problem is that the remaining pieces of bulb edge are difficult to remove. This is because the bulb edge as it snaps off the ribbon due to mechanical vibrations veers away from the score line(s) out to the ribbon edge. When this occurs, the pieces or fragments of glass remaining at the bulb edge are difficult to remove using automatic score opening equipment. This is because there is insufficient bulb edge width and length remaining that can be engaged to apply bending moment forces. Although the technique of removing bulb edges using hot air heaters to deepen the score is acceptable, the limitation of premature snapping of the bulb edge should be overcome for the above discussed reasons.

SUMMARY OF THE INVENTION

This invention relates to an improved method of severing a sheet of refractory material having a pair of opposed major surfaces, e.g., a glass ribbon. The method which is improved includes imposing a score in a major surface of the sheet and heating the score to propagate some into the glass spaced from the opposed major surface. Thereafter the score is extended to the opposed major surface to sever the sheet wherein premature uncontrolled extension of the score could occur. The improvement includes cooling the score line after practicing the heating step to prevent premature uncontrolled extension of the score line by increasing the compression force in the unsevered section of the glass.

This invention also relates to an apparatus for carrying out the method of the invention.

DETAILED DESCRIPTION OF THE INVENTION

Figure 1:
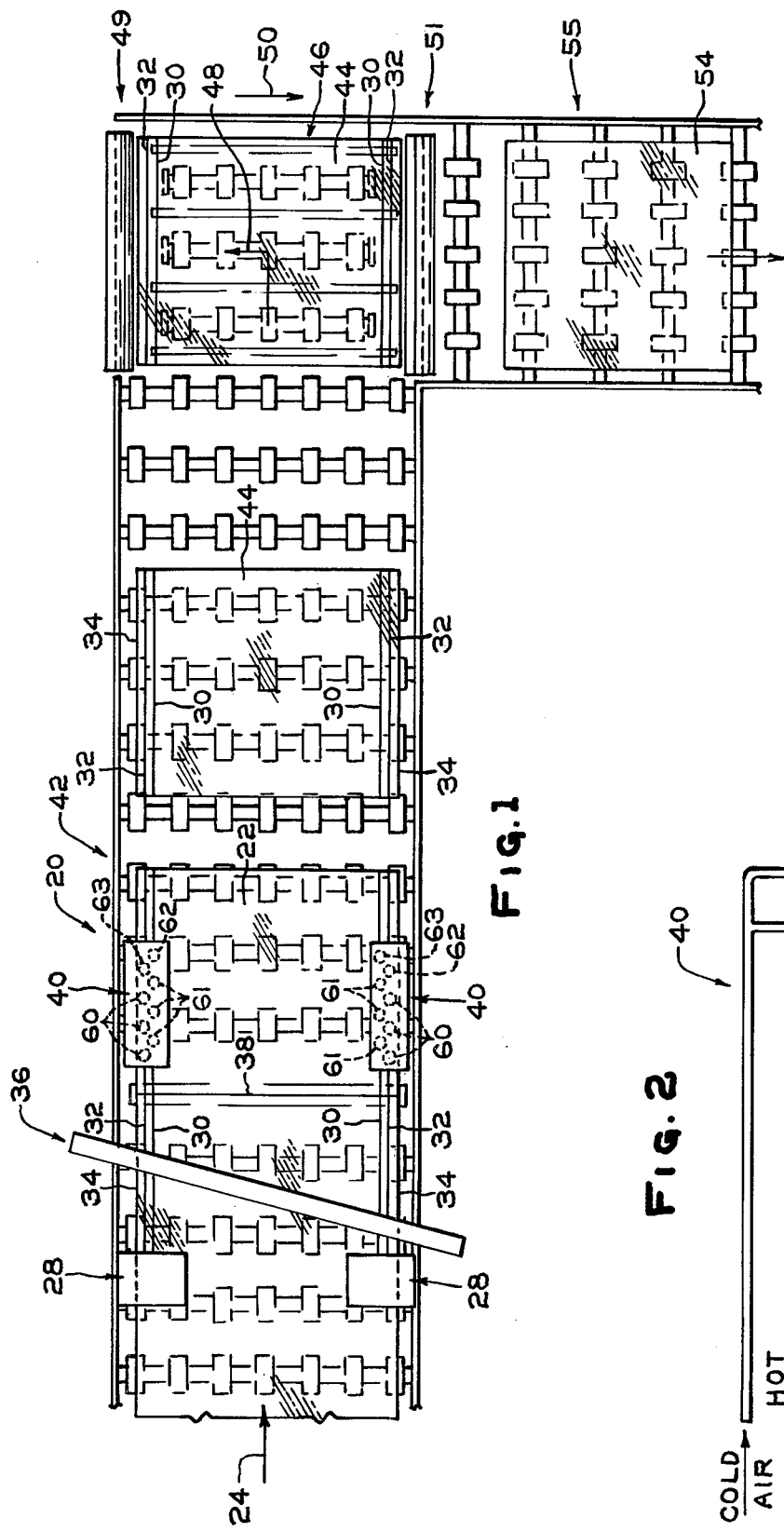
FIG. 1 is a plan view of a system incorporating features of the invention for removing bulb edges from a glass ribbon and severing the ribbon into glass sections.

Shown in FIG. 1 is a conveyor 20 for advancing a glass ribbon 22 in the direction of the arrow 24 past a pair of edge scoring devices 28 which impose a pair of score lines 30 and 32 spaced from each edge 34 of the glass ribbon, i.e., in the bulb edge of the ribbon; under lateral scoring or cross scoring equipment 36 to impose lateral score 38 in the glass ribbon 22; past score deepening equipment 40 incorporating features of the invention to propagate the fissure depth of scores 30 and 32; and past lateral score opening station 42 for opening the lateral score 38 to sever the ribbon 22 into lehr ends 44 having bulb edges. The lehr ends 44 having the bulb edge are advanced onto a tri-directional table 46 to move the lehr ends 44 in the direction of the arrow 48 through the bulb edge removing station 49 to sever the bulb edge at one side of the ribbon at score lines 30 and 32. The lehr end 44 is then moved by the table 46 in the direction designated by the arrow 50 through bulb edge removal station 51 to remove the remaining bulb edge at the other side of the sheet along score lines 30 and 32. Thereafter lehr end 54 having the bulb edges removed in advanced along the conveyor 55 in the direction of the arrow 50 for subsequent storing and/or cutting into sheets.

The discussion will be directed to ancillary equipment or procedural steps that are not limiting to the invention but are presented to illustrate the environment in which the invention may be practiced.

The scoring device 28 may be any of the types used in the art that impose a score in the glass of a sufficient depth so that the fissure or score can be propagated by heat. Annealed glass has opposed major surfaces in compression and interal body portions of the glass in tension. It is generally accepted that the compressive layer is approximately 20 percent of the glass thickness extending from the major surface toward the center of the glass and about 60 percent of the remaining glass thickness at the center thereof is in tension. A score imposed in a glass surface having a fissure depth of about 25 percent to about 40 percent of the glass thickness is recommended in the practice of the invention because the score interacts with heat to deepen the fissure. Scores having a fissure depth of about 18 to 25 percent of the glass thickness may also be used in the practice of the invention since they interact with heat when the surface is tapped. In other words, the surface beneath the score is tapped by a rigid rod as heat is applied to the opposite surface at the score line. Normally, a score having a fissure depth of less than about 18 percent of the glass thickness does not interact with heat even when the glass is tapped. When the fissure depth of the score is greater than about 40 percent of the glass thickness, the scoring equipment may punch through the glass which is not recommended in the practice of the invention. Scoring techniques that may be used in the practice of the invention but not limited thereto are taught in U.S. Pat. Nos. 3,800,991; 3,865,293; 3,865,294; and 4,057,184 which teachings are hereby incorporated by reference.

In FIG. 1, the ribbon 22 is shown having two score lines 30 and 32 at each ribbon edge 34 and a plurality of heaters 60 or 61 and a cooler 62 or 63 associated with each line. As can be appreciated the invention is not limited to the arrangement shown in FIG. 1. In the preferred embodiment of the invention only one score line 30 or 32 is imposed at the ribbon edge and is acted on by heaters 60 or 61 and cooler 62 or 63, respectively.

The cross scoring equipment 36 is not limiting to the invention and any of the types used in the art for imposing a score line in a moving glass ribbon may be used in the practice of the invention. Cross scoring equipment that may be used in the practice of the invention but not limited thereto is taught in U.S. Pat. No. 3,244,337, which teachings are hereby incorporated by reference.

Figure 2:
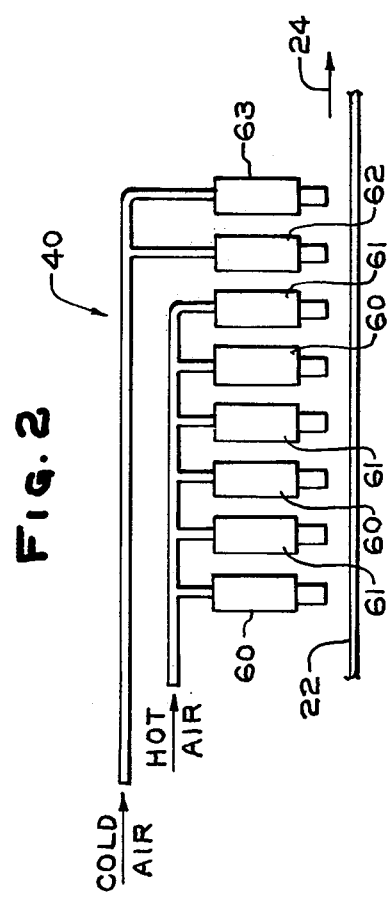
FIG. 2 is a side view of the heat deepening station of the system shown in FIG. 1 including facilities for preventing premature severing of the bulb edges in accordance to the teachings of the invention.

The glass ribbon, as it advances downstream, moves past the score deepening stations 40 incorporating features of the invention to propagate the fissure depth of the score into and through the tension zone of the glass to facilitate subsequent removal of the bulb edges at the score lines 30 and 32. With specific reference to FIG. 2, each of the heat deepening stations include a plurality of hot air heaters 60 and 61 for directing heated air toward score lines 30 and 32 respectively and coolers 62 and 63 for directing air at a temperature less than the temperature of the heated air of the heaters toward each score lines 30 and 32. The number of heaters and coolers associated with each score line is not limiting to the invention but should be sufficient to apply heat as the glass ribbon is displaced past the heaters to set up stresses in the glass to propagate the fracture into the thickness of the glass. Parameters which should be considered are (1) fissure depth of the score; (2) ribbon speed; and (3) amount of heat directed toward the glass. As the fissure depth of the score increases and the ribbon speed remains constant, less heat is required to propagate the fissure deeper into the glass and vice versa. As the ribbon speed increases, and the fissure depth of the score remains constant, more heat is required to propagate the fissure deeper into the glass and vice versa.

The amount of heat directed toward the glass is a function of (1) temperature of fluid moving toward the glass; (2) fluid flow; (3) number of heaters; (4) spaced distance between heaters and glass; and (5) spaced distance between heaters. As the temperature of the fluid increases with the remaining parameters constant, the heat directed toward the glass increases and vice versa. As the fluid directed onto the glass increases and the remaining parameters remain constant, the rate at which the glass is heated increases and vice versa. As the number of heaters increases with the remaining parameters kept constant, the heat directed toward the glass increases and vice versa. As the spaced distance between the heaters increase and the remaining parameters kept constant, the concentration of heat on the glass decreases and vice versa. As the spaced distance between the glass and heaters decrease with the remaining parameters kept constant, the concentration of heat on the glass increases and vice versa.

With the above discussion in mind, a score of the type taught in U.S. Pat. No. 4,057,184 was imposed on a 3/8 inch (0.95 centimeter) thick glass ribbon traveling at a speed of about 145 inches per minute (3.6 meters per minute). The score had a fissure depth of about 0.100 inch (0.254 centimeter) and was spaced about 2 1/2 inches (6.35 centimeter) from the edge of the ribbon. The ribbon advanced past four Sylvania Serpentine II Flameless Touch Air Heaters on a center-to-center spacing of 3 inches (7.62 centimeter) and spaced about 1/4 inch (0.64 centimeter) from the score. Air at a flow rate of about 250 cubic feet per hour (6.75 cubic meters per hour) and at a nozzle exit temperature of 600° F. (316° C.) was directed toward the score to propagate the fissure to a depth of about 0.300 inches (0.762 centimeters). If the glass ribbon speed decreases to 105 inches per minute (2.6 meters per minute) for a ribbon thickness of 1/2 inch (1.27 centimeter), only three heaters are needed to propagate a score from a depth of 0.125 inch (0.32 centimeter) to 0.400 inch (1.02 centimeter).

The cooler 62 or 63 mounted downstream of the heaters 60 or 61 respectively or upstream of the lateral score opening station 42 is used to prevent the bulb edges 34 from snapping during severing of the glass ribbon into lehr ends 44 at the lateral score opening station 42. The lateral score opening station is of the type known in the art where a snap roll is employed to raise the glass above the plane of the conveyor. In this manner, a bending moment is applied about the lateral score to open same.

The effect of the cooler 62 or 63 can better be appreciated from the following example. A glass ribbon having a thickness of 3/8 inch (0.95 centimeters) and a width of 136 inches (3.4 meters) was advanced at a speed of about 145 inches per minute (3.6 meters per minute) past scoring station 28 to impose a score line in the glass ribbon spaced about 3 to 4.5 inches (7.62 to 11.43 centimeters) from adjacent edge 34. The scores were of the type taught in U.S. Pat. No. 4,057,184 using a 4 inch (10.16 centimeters) diameter wheel having a 0.015 inch (0.038 centimeter) radiused scoring surface and under a load of 450 pounds (200 kilograms). The score had a depth of 0.085–0.090 inch (0.216–0.23 centimeter). The glass ribbon was crosscut at intervals of about 180 inches (4.5 meters). Thereafter, the glass ribbon moved through three Sylvania Serpentine II Flameless Touch Hot Air Heaters. The heaters were on a center-to-center spacing of about 3 inches (7.62 centimeters) and a spacing of about 15 inches (0.38 meter) from the snapping station 42. The heaters each were spaced about 1/4 inch (0.64 centimeter) above the score in the glass ribbon to direct air from each heater having an exit temperature of 600° F. (316° C.) against the ribbon at a flow rate of about 250 cubic feet per hour (6.75 cubic meters). The ribbon advanced past the heaters through the snapping station 42 where the lateral scores are opened to sever the lehr end 44 from the ribbon 22. During the severing of the ribbon, the bulb edge 34 from the snapper 42 to the heaters 60 or 61 fell off due to the impact or shock of the snap roll engaging and disengaging the ribbon.

The cooler 62 or 63 spaced about 3 inches (7.62 centimeters) from the downstream heater and about 12 inches (0.3 meter) upstream of the lateral score opening station 42 was energized to move room temperature air at a flow rate of 250 cubic feet per hour (6.75 cubic meters per hour) against the score. The cooler was a deenergized heater. The ribbon continued to advance through the severing station; however, the bulb edge 34 did not snap off. The cooler was shut down, i.e., the air flow stopped, and the bulb edge began to fall off as before.

The above was repeated on a ½ inch (1.27 centimeter) thick glass sheet to measure the temperature profile using an AGA Thermo Profile Instrument. The glass sheet after scoring had a temperature of about 80° F. (27° C.). After passing under three heaters, the temperature at the score line was about 266° F. (130° C.); about 150° F. (66° C.) at a spaced distance of about 1 inch (2.54 centimeters) from the score line in a direction transverse to the sheet advance; and about 80° F. (27° C.) at a spaced distance of about 2½ inches (5.35 centimeters) from the score line as measured above. After passing under a cooler, the temperature of the glass sheet at the score line was about 252° F. (123° C.); about 130° F. (53° C.) at a spaced distance of 1 inch (2.54 centimeters) from the score line as measured above; and about 80° F. (27° C.) at a spaced distance of about 2½ inches (5.35 centimeters) from the score line as measured above. The above temperature profile clearly shows that the temperature gradient in the glass increases when the cooler is employed.

Although the effect the coolers have on preventing premature snapping of the bulb edges is not completely understood, the following is believed to be the mechanism. The edges of the glass ribbon are in compression and the internal body is in tension as was previously discussed. The tension forces tend to pull the glass apart and the compressive forces at the surface act to pull the glass together. In addition, there is a compressive stress that acts on the glass in the direction of glass travel. When heat is applied to the glass to deepen the score, the compressive force increases as do the tension forces. However, the rate or the magnitude of increase of the tension forces is greater than the rate or magnitude of increase of the compressive forces. With this arrangement, the tension stresses tend to pull the glass apart which propagates the fissure deeper into the glass to the bottom compression layer. The mechanical vibrations set up in the glass ribbon, e.g., by the snapp roll, act as bending moment forces to sever the bottom compressive layer holding the bulb edge to the ribbon. The cold air directed toward the deepened score apparently increases the compressive forces at the bottom ribbon surface to a magnitude greater than the bending moment forces applied to the glass by mechanical vibrations due to the opening of the lateral score.

Referring now to FIG. 1, the lehr end 44 as it advances downstream of the lateral score opening station 42 is accelerated to increase the spaced distance between the trailing edge of the lehr end 44 and the leading edge of the glass ribbon to prevent edge contact which edge results in chipping. The snap roll used at the station 42 is not limiting to the invention and may be any of the types used in the art, e.g., of the type taught in U.S. Pat. No. 3,142,427, which teachings are hereby incorporated by reference. The lehr end 44 advances onto a tri-directional table 46 which moves the lehr end 44 in the direction of the arrow 48 through the bulb edge removal station 49 to remove the bulb edge 34 by applying bending moment forces about the score line 32 and, thereafter, the score line 30. After the trim is removed from one side, the glass sheet 44 advances in the direction of the arrow 50 through bulb edge removal station 51 where the procedure is repeated on the opposite side of the glass sheet to remove the remaining bulb edge. The type of equipment used at the bulb edge removal stations 49 and 51 is not limiting to the invention and may be any of the types used in the art. Because the bulb edge width is insufficient to provide a downward force, it is recommended that a hold down roll mounted above the conveyor be used. The hold down roll may be any of the types used in the art.

The lehr end 54 having the bulb edges removed is moved in the direction of the arrow 50 onto the conveyor 55. Thereafter the uncut is subsequently acted on to either stack the uncuts or advance the uncuts along additional conveyors where it is cut into glass sheets.

As can be appreciated the above example is presented for illustration purposes only and is not limiting to the invention. For example, the invention is not limited to severing glass ribbon but can be used to sever glass sheets. Further, the invention may be practiced on refractory materials other than glass, e.g., glass-ceramics and ceramics.

We claim:

1. In a method of severing a sheet of refractory material wherein the method includes the steps of imposing a score in the sheet; heating at least a portion of the sheet to propagate the score into the sheet without severing the sheet along the score; and severing the sheet along the score wherein premature uncontrolled extension of the score occurs in the heated sheet the improvement comprising:
   force cooling at least a portion of the heated sheet prior to practicing the severing step to cool a length of the score to prevent the premature uncontrolled extension of the score.

2. The method as set forth in claim 1 wherein the sheet of refractory material advances along a movement path and further including the steps of:
   practicing said imposing step to impose a first score generally parallel to the movement path; and
   scoring the sheet transverse to the first score to provide a second score in the sheet.

3. The method as set forth in claim 2 wherein the severing step includes the steps of:
   severing the sheet at the second score wherein premature uncontrolled extension of the first score occurs while practicing said step of severing the sheet at the second score; and
   severing the sheet at the first score.

4. The method as set forth in claim 3 wherein said severing step is practiced by raising the ribbon above the movement path to apply bending moments about the second score, followed by lowering the ribbon.

5. The method as set forth in claim 1 wherein the sheet of refractory material is a glass ribbon having bulb edges wherein the imposing step includes advancing the ribbon through a first scoring station to impose at least one score adjacent each edge of the ribbon; and through a second scoring station to impose a lateral score between the edges of the ribbon; the heating step includes heat deepening the score at the edge of the ribbon; and the severing step includes lifting the glass ribbon to apply bending moments about the lateral score to sever the glass ribbon wherein the premature uncontrolled extension of the at least one score occurs during the severing of the ribbon at the lateral score.

6. The method as set forth in claim 1 or 5 wherein the temperature difference at the score after practicing the heating step and said force cooling step is at least about 10° F. (5° C.).

7. The method as set forth in claim 1 wherein the heating step is practiced by directing heat toward the score.

8. The method as set forth in claim 7 wherein the cooling step is practiced by directing cooling air toward the score.

9. The method as set forth in claim 1 wherein the force cooling step is practiced by directing cooling air toward the score.

10. In a method of severing a sheet of refractory material having a pair of opposed major surfaces wherein the method includes the step of imposing a score in a major surface of the sheet; directing heated air toward the sheet to propagate the score into the sheet spaced from the opposed major surface; and extending the score to the opposed major surface to sever the sheet wherein premature uncontrolled extension of the score occurs the improvement comprising:

directing air at a temperature less than the temperature of the heated air at the score after practicing the heating step to prevent premature uncontrolled extension of the score.

11. In an apparatus for severing a ribbon of refractory material into sections, wherein the apparatus in of the type having a first scoring station to impose a score at the edges of the ribbon to be severed; a second score station for imposing a lateral score in the ribbon to be severed; means for applying heat to propagate the score; means for opening the lateral score; means for removing the edges of the ribbon and means for advancing the ribbon along the ribbon movement path, the improvement comprising:

means for cooling the ribbon mounted between the means for applying heat deepening station and means for opening the lateral score.

12. The apparatus as set forth in claim 11 where the ribbon is a glass ribbon having bulb edges.

13. The apparatus as set forth in claim 12 wherein said means for applying heat includes means for directing air at a predetermined temperature toward the movement path.

14. In an apparatus for severing a sheet of refractory material wherein the apparatus is of the type having means for imposing a score in the sheet; means for heating at least a portion of the sheet to propogate the score into the sheet without severing the sheet along the score; and means for severing the sheet at the score, the improvement comprising:

means for force cooling at least a portion of the sheet to cool a length of the score; and means for mounting said force cooling means between the heating means and severing means.

* * * * *